United States Patent
Walder et al.

(10) Patent No.: US 6,341,054 B1
(45) Date of Patent: Jan. 22, 2002

(54) INTELLIGENT POWER DISTRIBUTION NETWORK

(75) Inventors: Dennis Alan Walder, Oak Creek; Thomas Gerard Dolnik, South Milwaukee, both of WI (US)

(73) Assignee: McGraw-Edison Company, Houston, TX (US)

( * ) Notice: Subject to any disclaimer, the term of this patent is extended or adjusted under 35 U.S.C. 154(b) by 0 days.

(21) Appl. No.: 09/458,027

(22) Filed: Dec. 10, 1999

Related U.S. Application Data
(60) Provisional application No. 60/113,953, filed on Dec. 23, 1998.

(51) Int. Cl.$^7$ ................................................ H02H 3/00
(52) U.S. Cl. .............................. 361/66; 361/62; 361/64; 361/115
(58) Field of Search .............................. 361/62, 64, 66, 361/115

(56) References Cited

U.S. PATENT DOCUMENTS

| | | | |
|---|---|---|---|
| 3,909,677 A | 9/1975 | McClain | 317/29 R |
| 4,090,090 A | 5/1978 | Johnston | 307/87 |
| 4,345,291 A | 8/1982 | Riebs | 361/68 |
| 4,771,229 A | 9/1988 | Ziegler | 323/909 |
| 5,117,325 A | 5/1992 | Dunk et al. | 361/93 |
| 5,400,205 A | 3/1995 | Ligon et al. | 361/62 |
| 5,568,399 A | * 10/1996 | Sumie | 364/492 |
| 5,574,611 A | 11/1996 | Nishijima et al. | 361/64 |
| 5,579,195 A | 11/1996 | Nishijima et al. | 361/62 |
| 5,654,859 A | 8/1997 | Shi | 361/66 |
| 5,701,226 A | 12/1997 | Gelbien et al. | 361/63 |
| 5,784,237 A | 7/1998 | Velez | 361/62 |

OTHER PUBLICATIONS

Kyle ® Form 5 Electronic Recloser Control, Bulletin 97024 (May 1997), File: Catalog 280–79, pp. 1–12.
Form 5 Microprocessor–Based Recloser Control Technical Specifications, Bulletin 97025 (May 1997), File Reference: 280–79, pp. 1–4.
IntelliTeam™, A revolutionary peer–to–peer auto–reconfiguration system (Jul. 1996), DOC 033–000500–00, pp. 1–4.

* cited by examiner

Primary Examiner—Stephen W. Jackson
(74) Attorney, Agent, or Firm—Fish & Richardson P.C.

(57) ABSTRACT

A control system is used in an intelligent power distribution network. The power distribution network includes multiple branches, each of which is connected to a power source, electrical devices connected to the branches, and a normally-open device connected between two or more branches. The control system includes control elements, each control elements being associated with an electrical device connected to a branch of the distribution network. The control system also includes a master control element associated with the normally-open device. The master control element communicates with the control elements and, when a fault occurs on the distribution network, prevents the normally-open device from closing when information from the control elements indicate that conditions potentially disruptive to the distribution network would occur if the normally-open device were closed. The master control element permitts the normally-open device to close when information from the control elements indicate that conditions potentially disruptive to the distribution network would be avoided if the normally-open device were closed.

49 Claims, 5 Drawing Sheets

| LOCATION | EVENT | LOAD | 132 DEV 1 | 134 DEV 2 | 116 DEV 3 | 136 DEV 4 | 138 DEV 5 |
|---|---|---|---|---|---|---|---|
| A 112 | LESS OF V | OK | O | X | C | C | C |
| A 112 | LESS OF V | NOT OK | O | X | C | C | C |
| B 118 | FAULT | OK | O | X | C | C | C |
| B 118 | FAULT | NOT OK | O | X | C | C | C |
| C 120 | FAULT | OK | O | O | O | C | C |
| C 120 | FAULT | NOT OK | C | O | O | C | C |
| D 122 | FAULT | OK | C | O | O | C | C |
| D 122 | FAULT | NOT OK | C | C | C | C | C |
| E 124 | FAULT | OK | C | C | C | C | C |
| E 124 | FAULT | NOT OK | C | C | O | C | C |
| F 126 | FAULT | OK | C | C | O | O | O |
| F 126 | FAULT | NOT OK | C | C | C | O | O |
| G 128 | FAULT | OK | C | C | O | X | O |
| G 128 | FAULT | NOT OK | C | C | C | X | O |
| H 114 | LESS OF V | OK | C | C | O | X | O |
| H 114 | LESS OF V | NOT OK | C | C | O | X | O |
| NORMAL | NONE | OK | C | C | O | C | C |

O = OPEN POSITION OF DEVICE
C = CLOSE POSITION OF DEVICE
X = CHANGE OF SETTINGS OF DEVICE

INTELLIGENT POWER DISTRIBUTION NETWORK

This application claims the benefit of U.S. Provisional Application No. 60/113,953, filed Dec. 23, 1998.

TECHNICAL FIELD

The invention relates to power distribution networks.

BACKGROUND

Reclosers are used in an electrical power distribution network to detect faults in the network and isolate a device or load from the distribution network upon detection of the fault.

SUMMARY

The invention provides a control system for an intelligent power distribution network. The distribution network includes multiple branches, each of which is connected to a power source, electrical devices connected to the branches, and a normally-open device connected between two or more branches. The control system includes control elements, each control element being associated with an electrical device connected to a branch of the distribution network. The control system also includes a master control element associated with the normally-open device, the master control element communicating with the control elements. When a fault occurs on the distribution network, the master control element prevents the normally-open device from closing when information from the control elements indicate that conditions potentially disruptive to the distribution network would occur if the normally-open device closed. Moreover, the master control element permits the normally-open device to close when information from the control elements indicate that conditions potentially disruptive to the distribution network would be avoided if the normally-open device were closed.

Embodiments may include one or more of the following features. For example, a branch may include a corresponding load. The power source connected to a branch may provide a primary source of power to the corresponding load of the branch under predetermined operating conditions of the network. Alternatively, the power source connected to a branch may provide an auxiliary source of power to the corresponding load of the branch under predetermined operating conditions of the network. A control element may include a sensor that detects whether a fault occurs at the associated electrical device.

The electrical device may include a switching system that is controllably switched between a normal operating position and a fault operating position. When the electrical device is in the normal operating position, a load associated with the electrical device may be supplied power from the power source coupled to the electrical device. The control element may switch the electrical device to the fault operating position when the control element detects that a fault occurs at location that would disrupt power supplied to the associated load. Otherwise, the control element may switch the electrical device to the fault operating position in response to data from the master control element.

The master control element may communicate with a control element through a radio link. Likewise, the master control element may communicate with a control element through a fiber optic link. Or, the master control element may communicate with a control element through an electrical wire.

The master control element may reconfigure the power distribution network based on information from the control elements. Reconfiguration may include determining a direction of current flow through the electrical device. Reconfiguration may include accounting for changes in the direction of current flow through the electrical device.

Reconfiguration may include a primary reconfiguration that reconfigures an electrical device on the power distribution network independently of the configuration of other electrical devices and the normally-open device. Primary reconfiguration of the electrical device may be based on a voltage and a current measurement at the electrical device. Reconfiguration may include a secondary reconfiguration that reconfigures an electrical device on the power distribution network based on input from the master control element. The master control element may determine whether to reconfigure the network using the primary or secondary reconfiguration based on whether communication between any of the electrical devices or the normally-open device is active.

The master control element may monitor parameters in the power distribution network local to the normally-open device. The master control element may update a configuration of the power distribution network. The master control element may include a general purpose computer.

Conditions potentially disruptive to the power distribution network may include load conditions that exceed the capacity of the power distribution network. The normally-open device may include a tie recloser.

DETAILED DESCRIPTION

Figure 1:
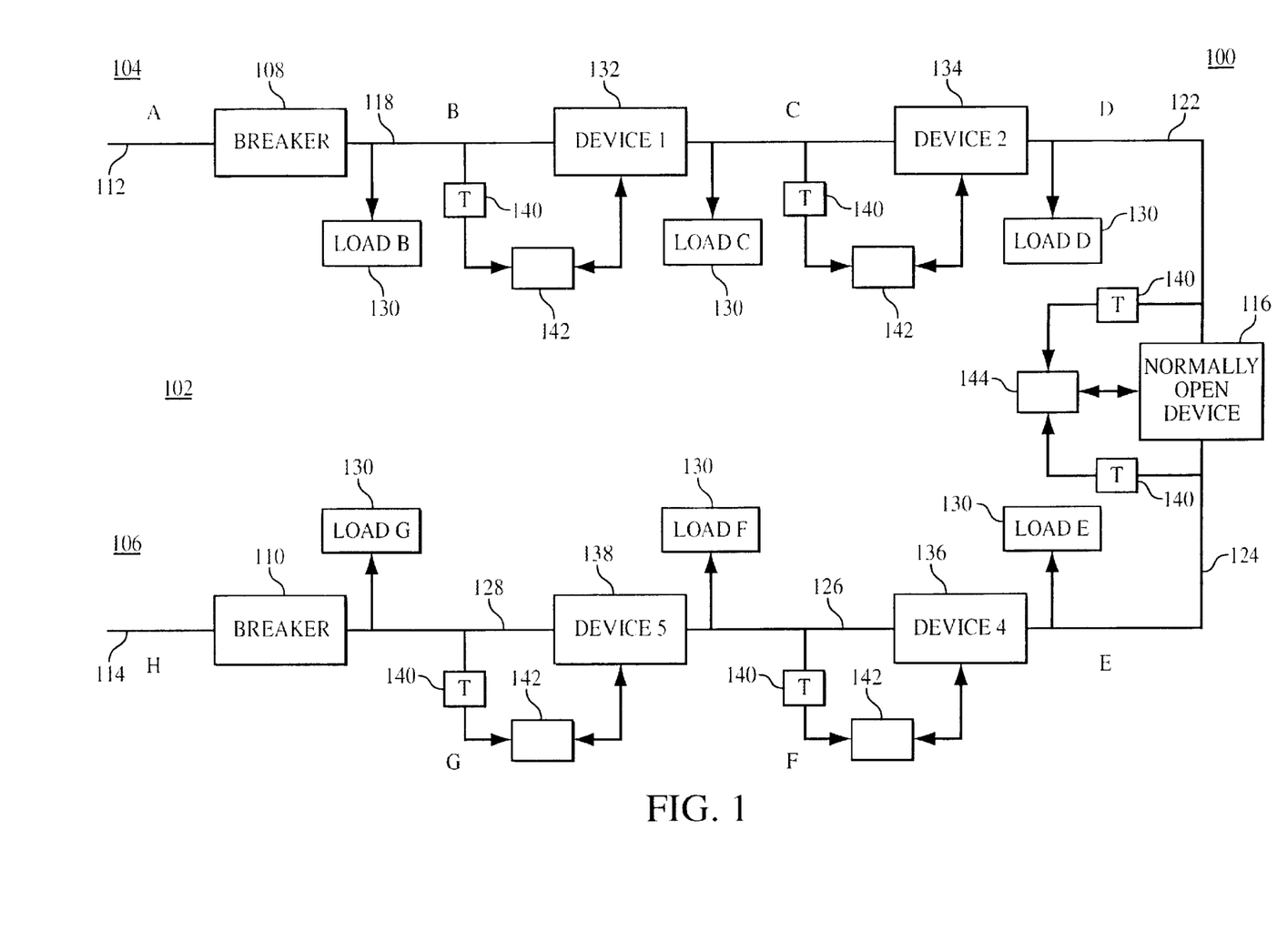
FIG. 1 is a block diagram of a control system used in an electrical power distribution network.

Referring to FIG. 1, an automatic control system 100 may be used to provide automatic sectionalizing and reconfiguration of an electrical power distribution network 102. The control system 100 employs intelligent devices in the distribution network 102 that communicate with each other to implement a sophisticated control methodology.

The distribution network 102 illustrated in FIG. 1 provides a simple example of control system operation. The distribution network 102 includes a first branch 104 and a second branch 106 respectively coupled at one end (by way of circuit breakers 108 and 110) to a first power input 112 and a second power input 114. Branches 104 and 106 are adapted to be electrically connected by a normally-open device such as a tie recloser 116. The tie recloser 116 monitors the voltage and current in the two branches 104 and 106 to which it is connected.

Load sections B 118, C 120, D 122, E 124, F 126, and G 128 are coupled to, and along, the branches 104 and 106 of the distribution network 102. Each load section includes a corresponding load 130 which may be, for example, a utility service entrance of one or more residences or commercial buildings.

The first power input 112 constitutes a primary source of power to the loads associated with the first branch 104 during normal operating conditions and, under specified fault conditions described below, may provide an auxiliary source of power to one or more of the loads in the second branch 106. Similarly, the second power input 114 provides a primary source of power to the loads associated with the second branch 106, and may provide an auxiliary source of power to one or more of the loads of the first branch 104.

Electrical devices (device 132, device 134, device 136, and device 138) are disposed between adjacent load sections of each branch. The electrical devices 132, 134, 136, 138, and the normally-open device 116 each include a switching system that is controllably switched between a normal position and a fault position. When the devices are in the normal positions, the load sections are supplied power from their primary sources. The devices switch to faulted positions to isolate and sectionalize a load section upon occurrence of a fault. For example, each switching system may respond to the combination of loss of voltage at its input and excessive current through the corresponding device. Loss of voltage may be sensed, for example, by a conventional voltage transformer 140 having its output coupled to a control element 142 or 144 for implementing a switching operation. Each switching system may include one or more switches, such as, for example, a load break oil switch or a vacuum interrupter.

Figure 2:
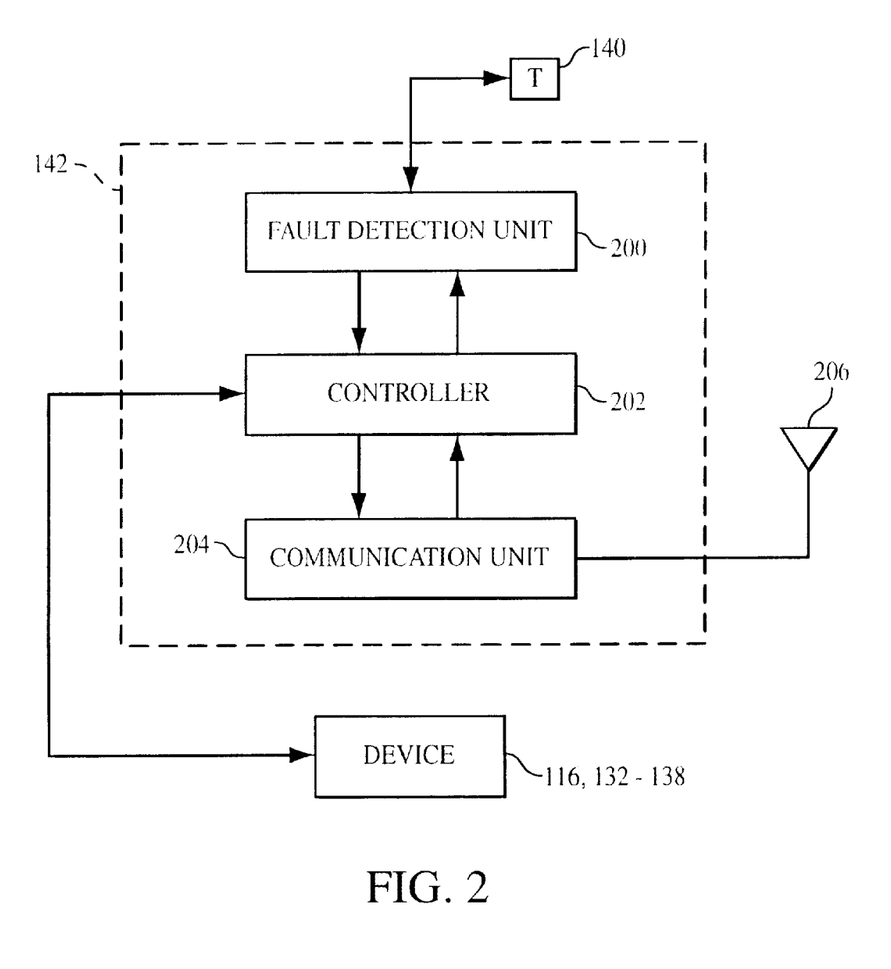
FIG. 2 is a block diagram of a control apparatus associated with devices in the power distribution network of FIG. 1.

Referring also to FIG. 2, each control element 142 includes a fault detection unit 200 coupled to the sensor or voltage transformer 140. Data flows between the detection unit 200 and a controller 202. The controller 202 receives and sends information to the associated device (116, 132–138) in the power distribution network 102. The control element 142 also includes a communication unit 204 coupled to the controller 202.

The control element 142 selectively controls operation of its associated device (116, 132–138) based on conditions local to the associated device or data received through the communication unit 204 from other devices. The communication unit 204 of the control apparatus 142 communicates with other communication units 204 associated with other devices via a suitable communication link, such as a radio link 206. Other suitable communication links include, for example, fiber optics, land lines, or power line carriers.

The control element 144 associated with the normally-open device 116 includes the same components as the control element of other devices, but is configured as a master control element. The master control element 144 provides supervisory control, reconfigures the power distribution network 102 based on information from the other devices, monitors local parameters, and updates distribution network configuration information.

Figure 3:
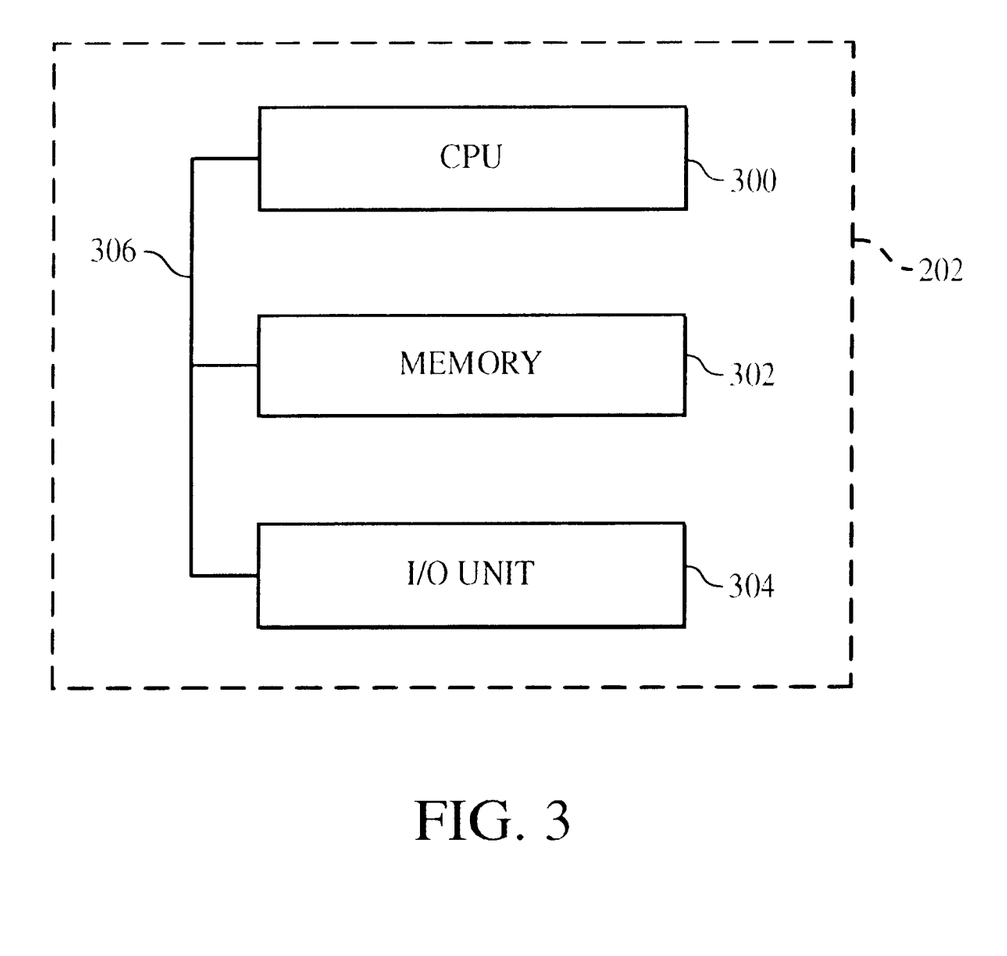
FIG. 3 is a block diagram of a controller used in the control apparatus of FIG. 2.

Referring also to FIG. 3, the controller 202 may include a processor 300 for performing the tasks described above, a storage device or memory 302 for storing data and any operating programs, and an input/output (I/O) unit 304 that interfaces with a user and the control element. These elements may be interconnected by a bus 306.

The control system 100 performs a number of functions through the control element 142 and the master control element 144. First, those elements employ loss of voltage and/or current detection methods to automatically locate and isolate a loss of electrical service. When doing so, the control element 142 and the master control element 144 automatically adjust the parameters of their associated electrical devices to provide distribution network coordination in either the forward or reverse direction. Thus, the control system 100 is able to reconfigure the electrical devices to account for changes in the direction of current flow due to distribution network reconfiguration.

The control system 100 also continuously monitors the load current status of all network electrical devices. In particular, each control element 142, 144 monitors the currents before a disturbance such as a fault occurs on the distribution network. Each processor 300 implements fault current detection procedures that may be monitored by the fault detection unit 200 to identify a fault location.

The master control element 144 automatically closes normally-open devices (for example, the tie recloser 116) in the distribution network 102 based upon load conditions and the location of the fault. The master control element 144 automatically prevents a normally-open device from closing into a fault or into load conditions that exceed the capacity of the distribution network. Thereafter, the master control element 144 automatically restores the distribution network 102 to its original parameters when monitoring of the electrical devices indicates that a fault condition has been corrected and that such restoration is appropriate.

The control system 100 allows the user to establish settings and parameters for all electrical devices used with the distribution network 102 via the I/O unit 304. The flexible system allows the user to select operating parameters based upon logical inputs and outputs to provide a complete operating system with a supplemental interconnection system between devices.

The control system 100 provides primary and secondary reconfiguration to allow for step increments in distribution network restoration. The primary system reconfigures the electrical devices on the distribution network independently of the secondary system. No interconnection or communication between electrical devices is required for the primary reconfiguration of the distribution network. All reconfiguration is based upon voltage and current detection at the respective control elements 142, 144. For example, if control element 142 associated with device 132 detects a fault on the load section 118, then the control element 142 may instruct the device 132 to open to sectionalize load section 118.

The secondary system reconfigures electrical devices on the system based on operation of the master control element 144 located at the normally-open device 116. The master control element 144 monitors all the electrical devices within the distribution network 102 to provide the necessary instructions to reconfigure the distribution network without any random fault closings or capacity restrictions. The user is able to continuously monitor all of the electrical devices within the distribution network to determine the status before, during, or after a disturbance. Restoration of the distribution network is obtained through the master control element 144 based upon automatic restoration, manual restoration, or a combination of the two, as selected by the user.

If the monitored voltage and current values indicate that a portion of a branch connected to the tie recloser 116 has lost power, the tie recloser 116 closes to connect that portion to the other branch. For example, if breaker 108 in the first branch 104 trips, causing a loss of power to devices 132 and 134, the tie recloser 116 may close to provide power from the second branch 106 to those devices.

Before closing, the tie recloser 116 communicates via the master control element 144 with the devices affected by the closure to enable them to reconfigure themselves using their respective control element 142 prior to the closure. Thus, in the example discussed above, the tie recloser 116 communicates with the devices to instruct them that power, which previously had been coming from the direction of first power input 112, will be coming from the direction of second power input 114, and to reconfigure themselves accordingly.

In some circumstances, automatic closure of the tie recloser 116 may be undesirable. For example, if breaker 108 has tripped due to a fault in device 134, closing the tie recloser 116 could result in tripping of breaker 110 and a resulting loss of power to devices 136 and 138. A similar problem may occur if the additional load on the operational branch caused by the connection of devices from the non-operational branch results in an excessive load on the operational branch and a resulting reduction in power to all devices.

The control system 100 avoids these problems because data about local conditions from the control element 142 of electrical devices in the distribution network 102 are collected by the master control element 144, which then controls operation of the tie recloser 116 based on that data. In this way, the control system 100 prevents the tie recloser 116 from closing into a fault or an excessive load condition.

Figure 4:
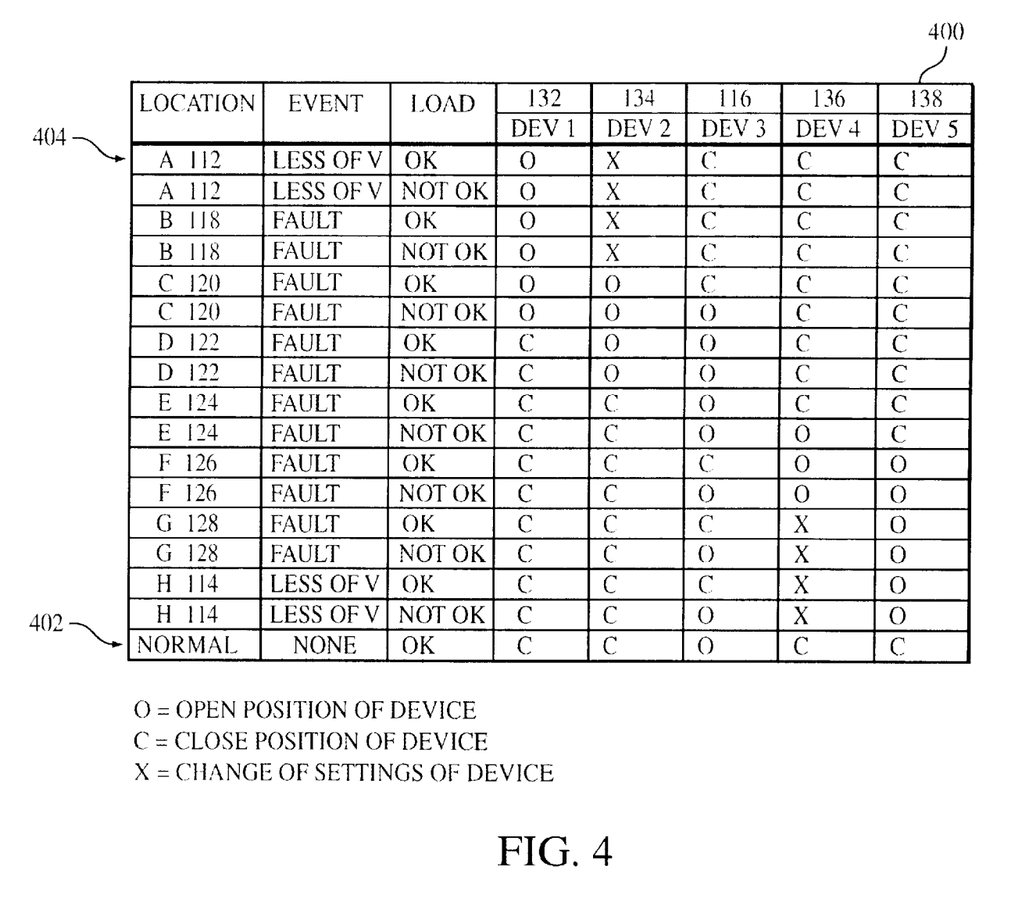
FIG. 4 is a table illustrating operation of distribution devices of the network of FIG. 1.

FIG. 4 illustrates, using a table 400, response of the tie recloser 116 (labeled Dev 3), as well as other distribution devices: device 132 (labeled Dev 1), device 134 (labeled Dev 2), device 136 (labeled Dev 4), and device 138 (labeled Dev 5), to different fault conditions and for normal operating condition (in row 402). As noted, the tie recloser 116, is a normally-open device that may be closed to connect the two branches. By contrast, the other devices 132, 134, 136, 138 are normally-closed devices that may be opened to isolate a fault condition. In general, a normally-closed device will open automatically in response to a fault condition. As noted, device settings are changed (indicated by an "X" in FIG. 4) in response to instructions from the control elements 142 or 144.

For example, in row 404, a loss of voltage fault occurs at power input 112. The master control element 144 determines that the additional load on the operational branch 106 caused by connection of device 134 would not result in excessive load on the operational branch 106 and a resulting reduction in power to all devices. Therefore, device 132 is opened to isolate the fault from the operational branch 106 and the tie recloser 116 is closed to provide an alternate source of power to the loads C and D. Additionally, because the device 134, in this new configuration, will be receiving power from a reverse direction, that is, from power input 114 and not from power input 112, the device 134 must be reconfigured (as indicated by the X in its column).

Figure 5:
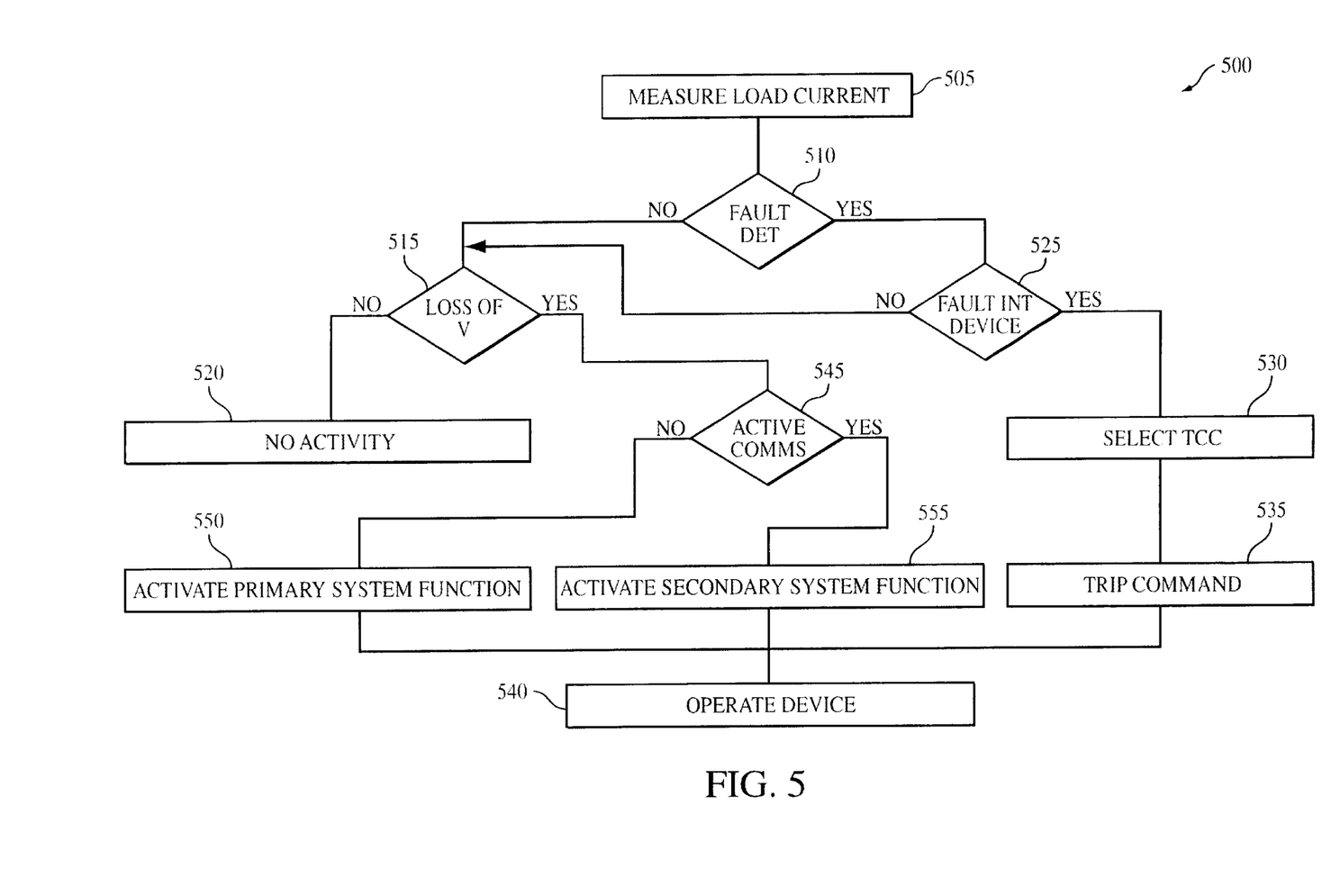
FIG. 5 is a flow chart illustrating a procedure implemented by the control system of the network of FIG. 1.

Referring to FIG. 5, the control system 100 operates each distribution device via control elements 142 and 144 according to a procedure 500. Initially, the control system 100 measures the load current at the device (step 505). If the control system 100 does not detect a fault current (step 510) or a loss of voltage (step 515), then the control system 100 performs no activity for the current time increment (step 520).

If the control system 100 detects a fault current (step 510), the control system determines whether the electrical device is a fault interrupting device (step 525), such as a recloser or switch. If the electrical device is a fault interrupting device, the control system 100 selects a time current characteristic (TCC) curve (step 530), initiates a trip command (step 535), and operates the device accordingly (step 540). The control system 100 checks to see whether the device is a fault interrupting device so as to avoid operations inappropriate for the device. For example, a switch not rated for interrupting large fault currents (for example, 20,000 amps) could be destroyed (for example, it could be melted) if it were opened to interrupt a large fault current.

If the control system 100 detects a loss of voltage (step 515) (after either not detecting a fault current (step 510) or detecting one for a device that is not a fault interrupting device (step 525)), the control system determines whether communications with other devices are active (step 545).

If communications between devices are not active, the control system 100 implements a primary system function (step 550) and operates the device accordingly (step 540). In general, the primary system function for a device is the one that is most likely to result in improved distribution network conditions. Thus, for example, in the case of a tie recloser, the control system 100 would automatically close the tie recloser, even though this risks closing into a fault or an excessive load.

If communications between devices are active, the control system 100 implements a secondary system function (step 555) and operates the electrical device accordingly (step 540). The secondary system function for an electrical device employs information about local conditions to reduce the risk that the electrical device operation will produce an unfavorable result. Thus, for example, in the case of a tie recloser, the control system would refrain from closing the tie recloser into a fault or an excessive load. By implementing the secondary function only when active communications are available to provide the information needed for the secondary function, the control system avoids significant problems that could result if the distribution network 102 were to do nothing in the event of a communications failure.

Other embodiments are within the scope of the claims.

What is claimed is:

1. A control system for an intelligent power distribution network including multiple branches, each of which is connected to a power source, electrical devices connected to the branches, and a normally-open device connected between two or more branches, the control system comprising:

control elements, each control element being associated with an electrical device connected to a branch of the distribution network; and a master control element associated with the normally-open device, the master control element communicating with the control elements and, when a fault occurs on the distribution network:

preventing the normally-open device from closing when information from the control elements indicate that conditions potentially disruptive to the distribution network would occur if the normally-open device were closed, and permitting the normally-open device to close when information from the control elements indicate that conditions potentially disruptive to the distribution network would be avoided if the normally-open device were closed.

2. The control system of claim 1, wherein a branch comprises a corresponding load.

3. The control system of claim 2, wherein the power source connected to a branch provides a primary source of power to the corresponding load of the branch under predetermined operating conditions of the network.

4. The control system of claim 2, wherein the power source connected to a branch provides an auxiliary source of power to the corresponding load of the branch under predetermined operating conditions of the network.

5. The control system of claim 1, wherein a control element comprises a sensor that detects whether a fault occurs at the associated electrical device.

6. The control system of claim 1, wherein the electrical device comprises a switching system that is controllably switched between a normal operating position and a fault operating position.

7. The control system of claim 6, wherein when the electrical device is in the normal operating position, a load associated with the electrical device is supplied power from the power source connected to the electrical device.

8. The control system of claim 7, wherein the control element switches the electrical device to the fault operating position when the control element detects that a fault occurs at location that would disrupt power supplied to the associated load.

9. The control system of claim 7, wherein the control element switches the electrical device to the fault operating position in response to data from the master control element.

10. The control system of claim 1, wherein the master control element communicates with a control element through a radio link.

11. The control system of claim 1, wherein the master control element communicates with a control element through a fiber optic link.

12. The control system of claim 1, wherein the master control element communicates with a control element through an electrical wire.

13. The control system of claim 1, wherein the master control element reconfigures the power distribution network based on information from the control elements.

14. The control system of claim 13, wherein reconfiguration comprises determining a direction of current flow through the electrical device.

15. The control system of claim 14, wherein reconfiguration comprises accounting for changes in the direction of current flow through the electrical device.

16. The control system of claim 13, wherein reconfiguration comprises a primary reconfiguration that reconfigures an electrical device on the power distribution network independently of the configuration of other electrical devices and the normally-open device.

17. The control system of claim 16, wherein primary reconfiguration of the electrical device is based on a voltage and a current measurement at the electrical device.

18. The control system of claim 16, wherein the reconfiguration comprises a secondary reconfiguration that reconfigures an electrical device on the power distribution network based on input from the master control element.

19. The control system of claim 18, wherein the master control element determines whether to reconfigure the network using the primary or secondary reconfiguration based on whether communication between any of the electrical devices or the normally-open device is active.

20. The control system of claim 1, wherein the master control element monitors parameters in the power distribution network local to the normally-open device.

21. The control system of claim 1, wherein the master control element updates a configuration of the power distribution network.

22. The control system of claim 1, wherein the master control element comprises a general purpose computer.

23. The control system of claim 1, wherein conditions potentially disruptive to the power distribution network include load conditions that exceed the capacity of the power distribution network.

24. The control system of claim 1, wherein the normally-open device comprises a tie recloser.

25. A method of controlling an intelligent power distribution network including multiple branches, each of which is connected to a power source, electrical devices connected to the branches, and a normally-open device connected between two or more branches, the method comprising:
associating a control element with each electrical device connected to a branch of the distribution network; and
associating a master control element with the normally-open device, the master control element communicating with the control elements and, when a fault occurs on the distribution network:
preventing the normally-open device from closing when information from the control elements indicates that conditions potentially disruptive to the distribution network would occur if the normally-open device were closed, and
permitting the normally-open device to close when information from the control elements indicates that conditions potentially disruptive to the distribution network would be avoided if the normally-open device were closed.

26. The method of claim 25, wherein the power source connected to a branch provides a primary source of power to a corresponding load of the branch under predetermined operating conditions of the network.

27. The method of claim 25, wherein the power source connected to a branch provides an auxiliary source of power to a corresponding load of the branch under predetermined operating conditions of the network.

28. The method of claim 25, wherein the electrical device comprises a switching system that is controllably switched between a normal operating position and a fault operating position.

29. The method of claim 28, wherein a load associated with the electrical device is supplied power from the power source connected to the electrical device when the electrical device is in the normal operating position.

30. The method of claim 29, wherein the control element switches the electrical device to the fault operating position when the control element detects that a fault occurs at location that would disrupt power supplied to the associated load.

31. The method of claim 29, wherein the control element switches the electrical device to the fault operating position in response to data from the master control element.

32. The method of claim 25, wherein the master control element reconfigures the power distribution network based on information from the control elements.

33. The method of claim 32, wherein reconfiguration comprises determining a direction of current flow through the electrical device.

34. The method of claim 33, wherein reconfiguration comprises accounting for changes in the direction of current flow through the electrical device.

35. The method of claim 32, wherein reconfiguration comprises a primary reconfiguration that reconfigures an electrical device on the power distribution network independently of the configuration of other electrical devices and the normally-open device.

36. The method of claim 35, wherein primary reconfiguration of the electrical device is based on a voltage measurement and a current measurement at the electrical device.

37. The method of claim 35, wherein the reconfiguration comprises a secondary reconfiguration that reconfigures an electrical device on the power distribution network based on input from the master control element.

38. The method of claim 37, wherein the master control element determines whether to reconfigure the network using the primary or secondary reconfiguration based on whether communication between any of the electrical devices or the normally-open device is active.

39. The method of claim 25, wherein the master control element updates a configuration of the power distribution network.

40. A method of controlling an intelligent power distribution network including multiple branches, each of which is connected to a power source, electrical devices connected to the branches, and a normally-open device connected between two or more branches, the method comprising:

communicating with control elements, each control element being associated with an electrical device connected to a branch of the distribution network; and when a fault occurs on the distribution network:

preventing the normally-open device from closing when information from the control elements indicates that conditions potentially disruptive to the distribution network would occur if the normally-open device were closed, and permitting the normally-open device to close when information from the control elements indicates that conditions potentially disruptive to the distribution network would be avoided if the normally-open device were closed.

41. The method of claim 40, further comprising reconfiguring the power distribution network based on information from the control elements.

42. The method of claim 41, wherein reconfiguring comprises determining a direction of current flow through the electrical device.

43. The method of claim 41, wherein reconfiguring comprises reconfiguring an electrical device on the power distribution network independently of the configuration of other electrical devices and the normally-open device.

44. The method of claim 41, wherein the reconfiguring comprises reconfiguring an electrical device on the power distribution network based on input from the master control element.

45. The method of claim 40, further comprising updating a configuration of the power distribution network.

46. A control system for an intelligent power distribution network including multiple branches, each of which is connected to a power source, electrical devices connected to the branches, and a normally-open device connected between two or more branches, the control system comprising a master control element associated with the normally-open device, the master control element receiving information from the electrical devices and, when a fault occurs on the distribution network:

preventing the normally-open device from closing when information from the electrical devices indicates that conditions potentially disruptive to the distribution network would occur if the normally-open device were closed, and permitting the normally-open device to close when information from the electrical devices indicates that conditions potentially disruptive to the distribution network would be avoided if the normally-open device were closed.

47. The control system of claim 46, wherein the master control element reconfigures the power distribution network based on information from the electrical devices.

48. The control system of claim 46, wherein the master control element monitors parameters in the power distribution network local to the normally-open device.

49. The control system of claim 46, wherein the master control element updates a configuration of the power distribution network.

* * * * *